United States Patent [19]

Sakaue

[11] Patent Number: 5,751,711
[45] Date of Patent: May 12, 1998

[54] DIGITAL INFORMATION PROCESSING DEVICE

[75] Inventor: Kenji Sakaue, Yokohama, Japan

[73] Assignee: Kabushiki Kaisha Toshiba, Kawasaki, Japan

[21] Appl. No.: 621,579

[22] Filed: Mar. 26, 1996

[30] Foreign Application Priority Data

Mar. 27, 1995 [JP] Japan ................................. 7-067821

[51] Int. Cl.$^6$ .......................................................... H04L 12/28
[52] U.S. Cl. ................................................ 370/431; 395/287
[58] Field of Search ....................................... 370/362, 364, 370/423, 431, 442, 445, 498; 395/287, 280, 306

[56] References Cited

U.S. PATENT DOCUMENTS

| | | | |
|---|---|---|---|
| 5,285,444 | 2/1994 | Sakurai et al. | 370/60 |
| 5,404,352 | 4/1995 | Pauwels et al. | 370/60 |
| 5,497,370 | 3/1996 | Hamada et al. | 370/60 |
| 5,519,696 | 5/1996 | Willman et al. | 370/58.2 |
| 5,566,169 | 10/1996 | Rangan et al. | 370/56 |

*Primary Examiner*—Hassan Kizou
*Assistant Examiner*—A. Bnimoussa
*Attorney, Agent, or Firm*—Foley & Lardner

[57] ABSTRACT

In an ATM cell processing device having a data transfer LSI capable of transferring ATM cells, and receiver LSIs capable of receiving the ATM cells having a same content, each data receiver LSI has a data input buffer, a data output buffer connected to the output side of the data input buffer and the input side of the data input buffer is connected to the output side of the data output buffer in the preceding data receiver LSI, and the output side of the data output buffer is connected to the input side of the data input buffer in the following data receiver LSI to form a data transfer path having a cascade connection so that the data of a same content transferred from the data transfer LSI is received in each of the data receiver LSIs in order.

14 Claims, 3 Drawing Sheets

DIGITAL INFORMATION PROCESSING DEVICE

BACKGROUND OF THE INVENTION

1. Field of the Invention

The present invention relates to a digital information processing device having a bus connection structure such as an Asynchronous Transfer Mode (ATM) cell processing device, and more particularly, it relates to a digital information processing device having a transfer path or line having a bus structure type.

2. Description of the Prior Art

In general, high speed interfaces (whose transfer rate is approximately 200 to 400 MHz, for example) such as ECL (Emitter Coupled Logic) and LVDS (Low Voltage Differential Signals) are commonly used for a point to point connection data transfer whose interface impedance is easily controlled or matched, and not used for a point to multi-point connection (namely, it has a bus connection configuration) the matching of whose interface impedance connection is difficult.

In addition, previously, the point to multi-point connection interface having the feature described above is used instead of the above point to point connection interface. Hereinafter, we will describe this technique with reference to FIGS. 1A and 1B.

FIGS. 1A and 1B are diagrams showing part of interface sections in each of a transfer LSI (large Scale Integration) and a receiver LSI forming a conventional ATM cell processing device (or called to as "a cross-point type ATM switch").

FIGS. 1A and 1B show a method of replacing the interface having the bus connection structure between LSIs with the point to point connection interface. FIG. 1A shows a part of the interface of the bus connection structure connected between LSIs. FIG. 2 shows the point to point interface with which the interface shown in FIG. 1A is replaced.

As shown in FIG. 1A, the conventional ATM cell processing device having the interface of the bus connection structure between LSIs comprises a LSI 101 which is capable of transferring packet data having a ATM cell format (hereinafter referred to as "transfer LSI"), and LSIs 102 and 103 (hereinafter referred to as "receiver LSI") capable of receiving the ATM cell from the transfer LSI 101. This transfer LSI 101 and the receiver LSIs 102 and 103 are connected by an interface of the point to multi-point connection.

As shown in FIG. 1B, this interface having the bus connection structure in the conventional ATM cell processing device as shown in FIG. 1A is replaced with an ATM cell distribution LSI 104 (hereinafter referred to as "a distribution LSI") as the point to point connection interface.

In the configuration as shown in FIG. 1A, the transfer LSI 101 must transfer cell data items to input buffers 102a and 103a in the receiver LSIs 102 and 103 through an output buffer 101a under the point to multi-point connection. On the other hand, in the configuration as shown in FIG. 2B, the transfer LSI 101 transfers only the input buffer 104a under the point to point connection through the output buffer 101a. Then, the distribution LSI 104 transfers the received cell data items transferred from the transfer LSI 101 to the input buffers 102a and 103a in the receiver LSIs 102 and 103 through output buffers 104b and 104c under the point to point connection. Reference characters 102b, 103b and 104b designate terminal resistances (or terminating resistances).

However, there the following problem or drawbacks in the prior art. As shown in FIG. 1B, in the conventional ATM cell processing device described above, it must be further required to incorporate the distribution LSI 104 in the ATM cell processing device. In addition, the cost of the ATM cell processing device becomes high, and the number of lines or wires in a LSI board on which the ATM cell processing device is mounted is significantly increased. Accordingly, it is difficult to design an arrangement on a board on which many devices including this ATM cell processing device are placed, because it is impossible to expand a size of the ATM cell processing device on the board. For example, when the number of input/output ports in a cross point type ATM switch is increased (when the number of cross points is increased and each data receiver LSI is located on each cross-point, for example, changing from a 16 input/output port configuration to a 32 input/output port configuration), the number of signal lines or wires on a board on which the ATM cell processing device is mounted is significantly increased. This becomes a serious problem and the possibility of the expansion of the switch interface in the ATM cell processing device becomes lower.

SUMMARY OF THE INVENTION

The present invention is invented in order to overcome the problems included in the conventional digital information processing device such as the ATM cell processing device described above.

An object of the present invention is to provide a digital information processing device whose fabrication cost is lower. Another object of the present invention is to provide a digital information processing device having a bus connection structure whose configuration formed on a board is easily designed and whose expandability in size is high.

In accordance with one aspect of the present invention, there is provided a digital information processing device, comprising: a data transfer Large Scale Integration (LSI) capable of transferring data; and a plurality of data receiver LSIs connected in a cascade connection to each other capable of receiving said data having a same content transferred from said data transfer LSI, each of said plurality of data receiver LSIs comprising a data input buffer for receiving said data; and a data output buffer connected to an output side of said data input buffer, wherein an input side of said data input buffer in one of said plurality of data receiver LSIs is connected to an output side of said data output buffer in said data receiver LSI in a preceding stage, and an output side of said output buffer in one of said plurality of data receiver LSIs is connected to an input side of said data input buffer in said data receiver LSI in a following stage in order to form a data transfer path having said cascade connection.

In the digital information processing device described above, in said data transfer path having said cascade connection, said data transfer LSI transfers said data to said data receiver LSI in a first stage in said plurality of data receiver LSIs, and said data receiver LSI in the first stage receives only said data having the same content and stores said data into said data input buffer in said data receiver LSI in the preceding stage.

In the digital information processing device described above, said data transfer LSI transfers data including an identifier or identifiers designating said one or more data receiver LSIs in said plurality of data receiver LSIs to said data input buffer in said data receiver LSI in the first stage in said data path having said cascade connection, and each of said plurality of data receiver LSIs further comprises detection means for checking whether or not said data transferred from said data transfer LSI is transferred, after a checking operation in each data receiver LSI, said data receiver LSI receives and stores said data therein only when said data is transferred from said data transfer LSI.

In the digital information processing device described above, said data transfer LSI transfers said data to said data input buffer in said data receiver LSI in a first stage in said plurality of data receiver LSIs, each of said plurality of data receiver LSIs further comprising a changeable delay means incorporated between said data input buffer and said data output buffer in each data receiver LSI through which said data is delayed by a time corresponding to its own stage number counted from said data transfer LSI in said data path having said cascade connection, and thereby each of said plurality of receiver LSIs stores said data transferred from said data transfer LSI by delaying storing operation by the corresponding delay time.

In the digital information processing device described above, each of said plurality of data receiver LSIs further comprises detection means for checking whether or not said data transferred from said data transfer LSI is transferred, after a checking operation by said detection means in each data receiver LSI, said data receiver LSI stores therein said data only when said data is transferred from said data transfer LSI.

In the digital information processing device described above, said changeable delay circuit comprises a flip-flop circuit, said data transfer path is made up of said plurality of data receiver LSIs connected in the cascade connection, and said flip-flop circuit forming said changeable delay circuit is incorporated between said data input buffer and said data output buffer.

In the digital information processing device described above, said data transfer LSI is capable of transferring packet data based on an ATM cell format as said data to be transferred, and each of said plurality of data receiver LSIs is capable of receiving and processing said packet data.

Further, in the digital information processing device described above, said data transfer LSI further comprises a bit clock buffer for transferring a bit clock and each of said plurality of data receiver LSIs comprises a bit clock buffer for receiving said bit clock transferred from said data transfer LSI through said data receiver LSIs in preceding stages, and said data transfer LSI and said plurality of data receiver LSIs operate synchronously to each other.

In addition, in the digital information processing device described above, said data transfer LSI further comprises a system clock buffer for receiving a system clock and each of said plurality of data receiver LSIs comprises a system clock buffer for receiving said system clock, and said data transfer LSI and said plurality of data receiver LSIs operate in synchronism with said system clock to each other.

Accordingly, in the digital information processing device having each of the configurations described above, each of the plurality of data receiver LSIs receives the data transferred from the data transfer LSI through the data input buffer and the data output buffer in the data receiver LSI in the first stage, and each of the data receiver LSIs transfer this data through its own data output buffer to the following data receiver LSI in order. Thereby, each of the data receiver LSIs can transfer the data in the point to point connection.

In addition, because each of the data receiver LSIs is capable of selecting the data transferred from the data transfer LSI, the data transfer LSI can transfer the data only to a target receiver LSI or to target receiver LSIs.

Moreover, because each of the data receiver LSIs is capable of adjusting (or delaying) a receiving timing to receive the data transferred from the data transfer LSI, the receiving timing delay between the data receiver LSIs can be reduced to the minimum receiving timing delay value.

Furthermore, because the data is transferred through the flip flop circuit incorporated in each of the data receiver LSIs, the data input and output operations in each of the data receiver LSIs can be performed in synchronism with a clock such as a bit cycle generated based on the system clock.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferred embodiments of the present invention will be explained.

Embodiment 1.

The configuration and the operation of a digital information processing device as a preferred embodiment of the present invention will now be explained below with reference to FIG. 2.

Figure 2:
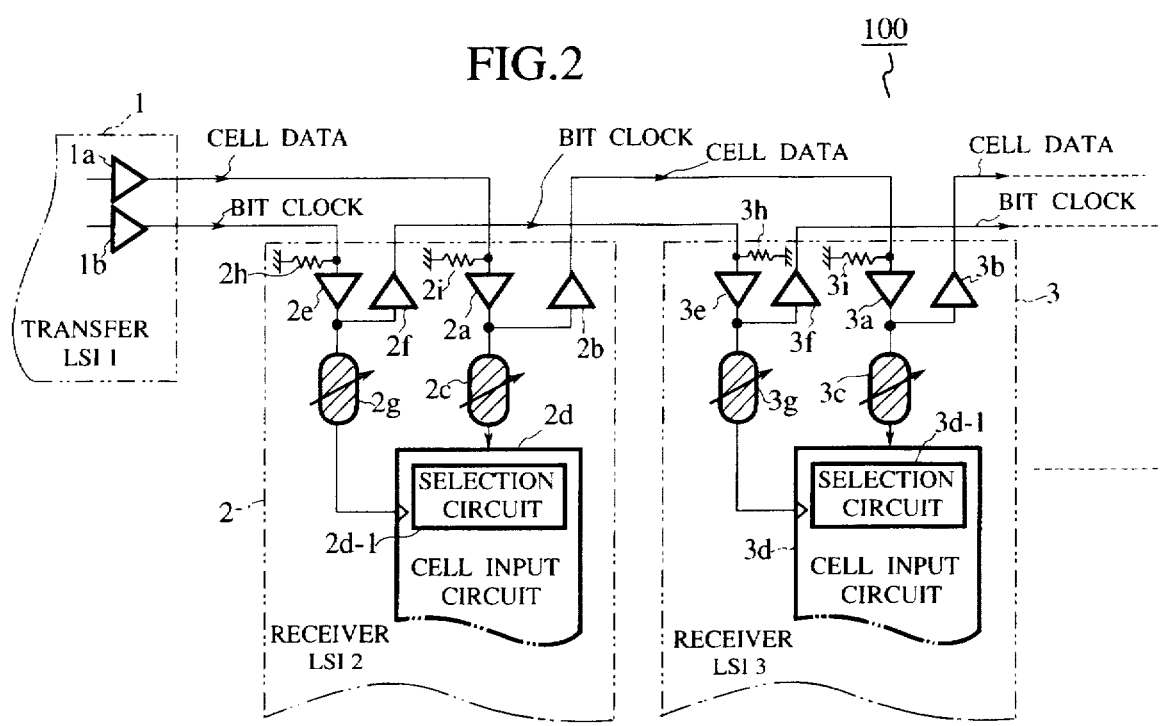
FIG. 2 is a circuit diagram showing a part of an interface (as a cross-point type ATM switch) between a transfer LSI and receiver LSIs forming an ATM cell processing device as a preferred embodiment 1 according to the present invention.

FIG. 2 is a circuit diagram showing a part of an interface (as a cross-point type an Asynchronous Transfer Mode (ATM) switch) between a data transfer LSI and two data receiver LSIs forming the ATM cell processing device 100 as the digital information processing device of the embodiment 1 according to the present invention.

The ATM cell processing device 100 having a cross point type switch configuration comprises a transfer LSI 1 capable of transferring a packet data or cell data having a ATM cell format (hereinafter the packet data is referred to as "cell data"), and both receiver LSIs 2 and 3 capable of receiving the cell data transferred from the transfer LSI 1. In FIG. 2, although the number of the receiver LSIs is two for concise expression, it is acceptable to add more than two LSIs in the ATM cell processing device 100. In the cross-point type ATM switch, each data receiver LSI is placed on each cross point, namely the data receiver LSIs form the cross-point type ATM switch.

The transfer LSI 1 comprises an output buffer 1a for storing temporarily the cell data to be transferred to the receiver LSIs 2 and 3 and an output buffer 1b for supplying a bit clock to be supplied to the receiver LSIs 2 and 3.

The receiver LSI 2 comprises a data input buffer 2a for receiving the cell data from the transfer LSI 1, a data output buffer 2b connected to the output side of the data input buffer 2a, a data input buffer 2e for receiving the bit clock supplied from the transfer LSI 1, a data output buffer 2f connected to the output side of the data input buffer 2e, and a cell input circuit 2d which is connected to both the data input buffers 2a and 2e through changeable delay circuits 2c and 2g, respectively.

Further, the configuration of the receiver LSI 3 is the same as the configuration of the receiver LSI 2; Namely, the receiver LSI 3 comprises a data input buffer 3a for receiving the cell data from the receiver LSI 2, a data output buffer 3b connected to the output side of the data input buffer 3a, a data input buffer 3e for receiving the bit clock supplied from the receiver LSI 2, a data output buffer 3f connected to the output side of the data input buffer 3e, and a cell input circuit 3d which is connected to both the data input buffers 3a and 3e through changeable delay circuits 3c and 3g, respectively. In FIG. 2, reference characters 2h, 2i, 3h and 3i designate terminal resistances (or terminating resistances). Here, a delay time in each of these changeable delay circuits 2c, 2g, 3c and 3g in the receiver LSIs 2 and 3 can be changed with a program by a user side or an operator side.

The data transfer path or line is formed by connecting the output sides of the data output buffers 2b and 2f in the receiver LSI 2 to the input sides of the data input buffers 3a and 3e. In this data transfer line, the transfer LSI 1 transfers the cell data and the receiver LSI 2 receives the cell data from the transfer LSI 1 and then, the receiver LSI 3 receives the cell data from the receiver LSI 2 in order.

Next, the operation of the ATM cell processing device 100 as the digital information processing device of the embodiment 1 will be explained.

In the ATM cell processing device 100 of the embodiment 1, the transfer LSI 1 and the receiver LSIs 2 and 3 are performed synchronously, namely the LSIs 1, 2 and 3 operates in a synchronism with a system clock in a board (not shown) on which the ATM cell processing device 100 is mounted. The cell data is transferred between the transfer LSI 1 and the receiver LSIs synchronously. For this reason, the bit clock (or a cell transfer clock) is required to transfer the cell data between the LSIs 1, 2 and 3.

There are two following cases in cell data transfer. In the first transfer case, the transfer LSI 1 transfers a cell data to only one of the receiver LSIs 2 and 3. In the second transfer case, the transfer LSI 1 transfers a cell data to both the receiver LSIs 2 and 3. In both cases, the transfer LSI 1 adds an identifier into the header in the cell data to be transferred to identify the receiver LSI. Of course, when the cell data is transferred to both the receiver LSIs 2 and 3, the identifiers designating both the receiver LSIs 2 and 3 are added into the header of the cell data to be transferred.

The receiver LSIs 2 and 3 have selection circuits (or detection means) 2d-1 and 3d-1, respectively for checking whether or not the cell data is transferred from the transfer LSI 1. In other words, each of the selection circuits 2d-1 and 3d-1 checks whether or not its own identifier is in the header section of the cell data. When there is such an identifier in the header section of the cell data which has been transferred, the receiver LSI receives the cell data into the cell input circuit 2d or 3d inside of the receiver LSI 2 or 3.

On the other hand, when the transfer LSI 1 transfers the cell data to both the receiver LSIs 2 and 3, the transfer LSI 1 transfers the cell data and the bit clock only to the receiver LSI 2. Further, the transfer LSI 1 transfers the cell data and the bit clock to the receiver LSI 3 through the input and output buffers 2a, 2b, 2e and 2f in the receiver LSI 2. Thereby, the transfer LSI 1 can transfer the cell data to the receiver LSIs 2 and 3 under the point to point connection.

In the ATM cell processing device 100 of the embodiment 1, because each LSI in the ATM cell processing device mounted on a board (not shown) can transfer cell data asynchronously to each other, it is acceptable to have a timing delay to receive the cell data in each LSI. The absolute value of this timing delay is called "a skew". However, the allowable maximum value of the clock skew is previously determined.

The receiving of the cell data in the receiver LSI 3 is delayed by a time delay (referred to as "a path time or a way time") which is required to pass the cell data through the receiver LSI 2. Accordingly, the cell data and the bit clock are delayed by the above time delay by transferring the cell data and the bit clock through the changeable delay circuits 2c and 2g in the receiver LSI 2. After this, the cell data is received into the cell input circuit 2d. In the receiver LSI 3, the time delay value "zero" (namely "0") is set into each of the changeable delay circuits 3c and 3g in order to reduce the skew and to receive the cell data into the receiver LSI 3.

It is not required to incorporate a skew reduction function to reduce a skew into each LSI in the ATM cell processing device only when it can be previously predicted that the entire skew time is within the maximum allowable value.

Although, the number of the receiver LSIs is two in the ATM cell processing device 100 of the embodiment 1 described above, the present invention is not limited to this configuration. It is acceptable that the ATM cell processing device comprises at least two receiver LSIs. In this case, the delay value of each changeable delay circuit in each receiver LSI is determined based on the stage number counted from the transfer LSI 1 side.

In addition, in the ATM cell processing device 100 of the embodiment 1, when the number of the receiver LSIs (forming the cross-point type ATM switch) is increased, namely the number of cross-points is increased and the number of input/output ports of the ATM cell processing device is increased. In this case, these receiver LSIs may be connected in serial, just like the case of the receiver LSIs 2 and 3 described above. Further, the delay time in the changeable delay circuit in each receiver LSI in order to reduce the skew in time may be set by an operator or a user based on the path time length similarly to the embodiment 1 described above.

Embodiment 2.

The configuration and the operation of a digital information processing device as another preferred embodiment of the present invention will now be explained below with reference to FIG. 3.

Figure 3:
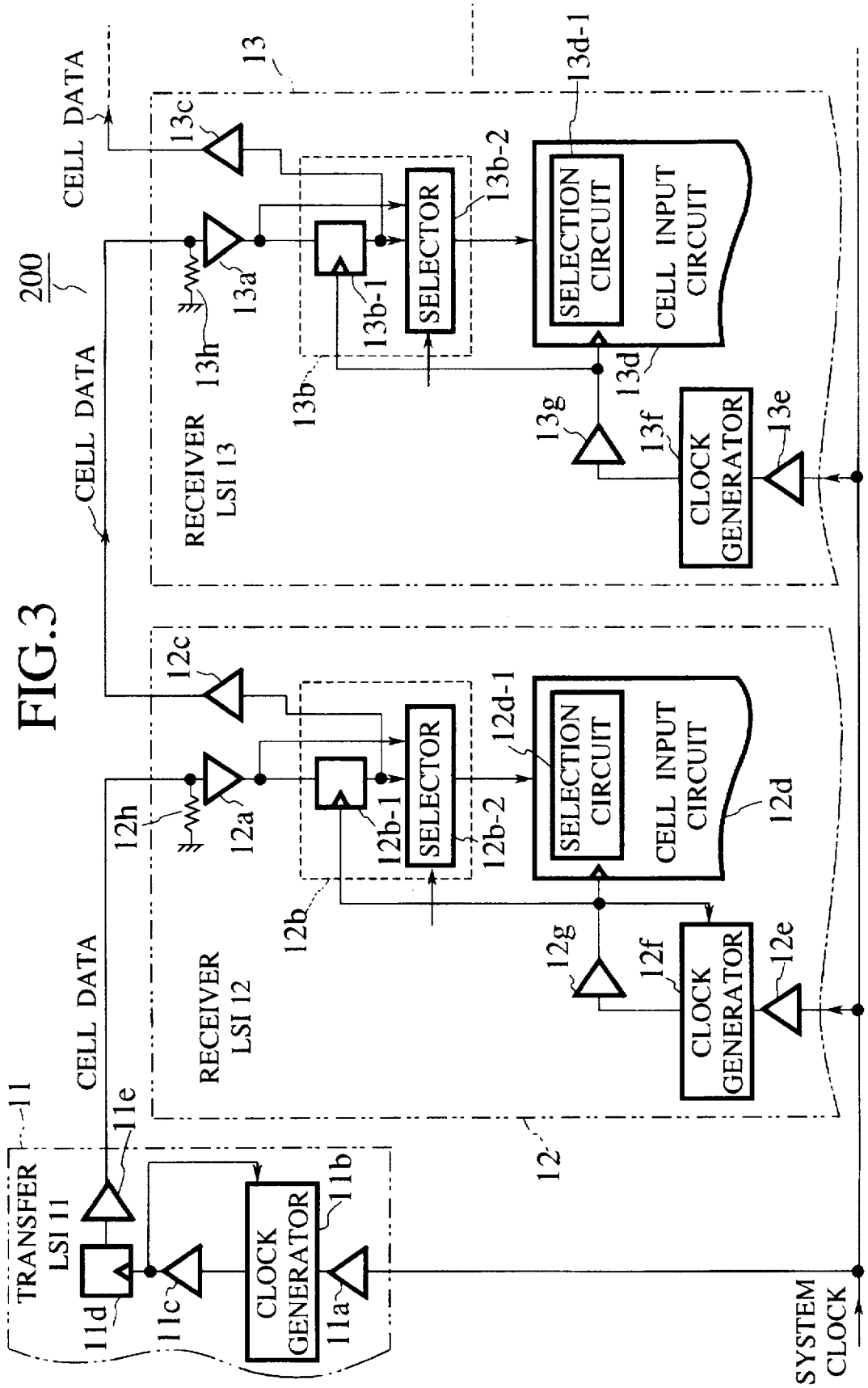
FIG. 3 is a circuit diagram showing a part of an interface (as a cross-point type ATM switch) between a transfer LSI and receiver LSIs forming an ATM cell processing device as a preferred embodiment 2 according to the present invention.

FIG. 3 is a circuit diagram showing a part of an interface (as a cross-point type ATM switch) between a transfer LSI and data receiver LSIs forming the ATM cell processing device 200 as the digital information processing device of the embodiment 2 according to the present invention. In the cross-point type ATM switch, each data receiver LSI is placed on each cross point.

Each LSI incorporated in the ATM cell processing device 100 of the embodiment 1 operates synchronously with each other by using a system clock on the board on which the ATM cell processing device 100 is mounted.

Figure 1A:
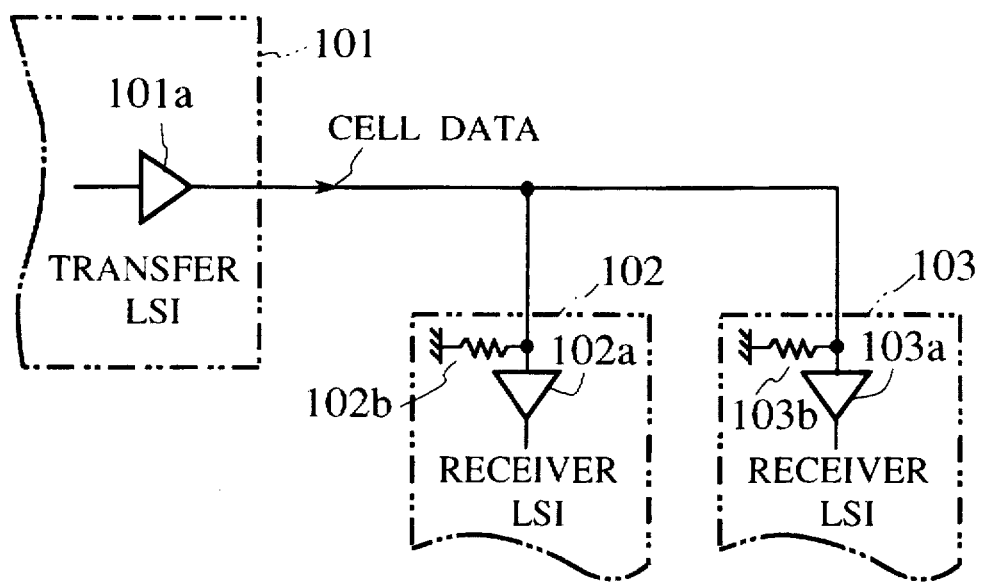
FIGS. 1A and 1B are diagrams showing a part of interface section in each of a transfer LSI and a receiver LSI forming a conventional ATM cell processing device (or a cross-point type ATM switch).
Figure 1B:
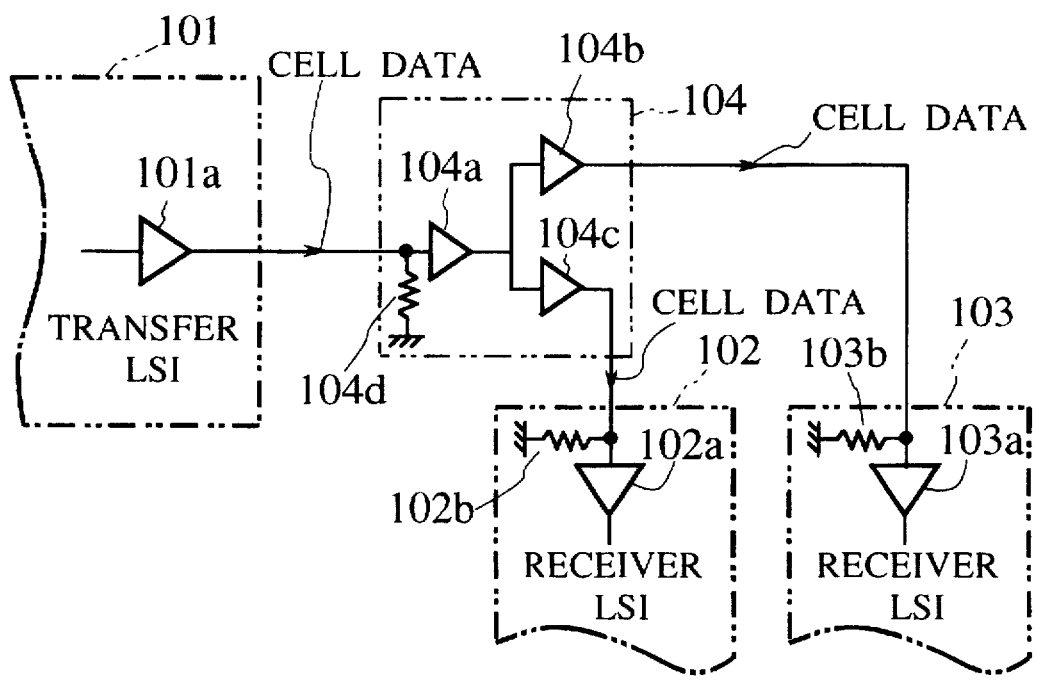

Conversely, a transfer LSI 11 and receiver LSIs 12 and 13 in the ATM cell processing device 200 of the embodiment 2 operate in synchronism with the system clock on the board on which the ATM cell processing device 200 is mounted. Accordingly, for this reason described above, each LSI in the ATM cell processing device 200 does not use the bit clock which is used in the ATM cell processing device 100 of the embodiment 1 shown in FIG. 1. In the ATM cell processing device 200 of the embodiment 2, a cell data is transferred through each flip-flop circuit in each LSI. In addition, in the ATM cell processing device 200, a changeable delay circuit in each LSI is made up of a digital circuit using a flip-flop circuit. These features are different from the ATM cell processing device 100 of the embodiment 1.

The ATM cell processing device 200 of the embodiment 2 comprises the transfer LSI 11 and the receiver LSIs for receiving cell data transferred from the transfer LSI 11. These LSIs 11, 12 and 13 perform in synchronism with the system clock. The transfer LSI 11 comprises a buffer 11a for receiving the system clock, a clock generator for generating a bit clock which is connected to the output terminal of the buffer 11a, and a buffer 11c. The buffer 11a, the clock generator 11b and the buffer 11c are connected in series.

The clock generator 11b comprises a PLL (Phase Locked Loop) circuit and a clock multiplier circuit or a clock divider. In addition, the output terminal side of a flip flop circuit 11d which operates in synchronism with the bit clock transferred from the clock generator 11b through the buffer 11c is connected to the output buffer 11e from which cell data is transferred to receiver LSIs 12 and 13.

The receiver LSI 12 comprises a data input buffer 12a for receiving the cell data from the transfer LSI 11, a changeable delay circuit 12b which is connected to the output terminal of the buffer 12a, a clock generator 12f, a cell input circuit 12d and a buffer 12e.

This changeable delay circuit 12b comprises a flip flop circuit 12b-1 for receiving and storing the output from the buffer 12a in synchronism with the system clock and a selector 12b-2 for selecting one of the output from 12a based on a selection signal transferred from outside of the receiver LSI 12. The output terminal of the flip flop circuit 12b-1 is connected to the input terminal of a data output buffer 12c and the output terminal of the selector 12b-2 is connected to the input terminal of the cell input circuit 12d.

The output terminal of the buffer 12e for receiving the system clock is connected to the clock generator 12f for generating the bit clock and to the buffer 12g in series. The bit clock transferred from the clock generator 12f is transferred to both the clock terminal of the cell input circuit 12d and the clock terminal in the flip flop circuit 12d-1 in the changeable delay circuit 12b.

The receiver LSI 13 is similar to the receiver LSI 12 in configuration. Specifically, the receiver LSI 13 comprises a data input buffer 13a for receiving the cell data from the receiver LSI 12, a changeable delay circuit 13b which is connected to the output terminal of the buffer 13a, a clock generator 13f, a cell input circuit 13d and a buffer 13e. This changeable delay circuit 13b comprises a flip flop circuit 13b-1 for receiving and storing the output from the buffer 13a in synchronism with the system clock and a selector 13bb-2 for selecting one of the output from the flip flop circuit 13b-1 and the output from the buffer 13a based on a selection signal transferred from outside of the receiver LSI 13. The output terminal of the flip flop circuit 13b-1 is connected to the input terminal of a data output buffer 13c and the output terminal of the selector 13b-2 is connected to the input terminal of the cell input circuit 13d. The output terminal of the buffer 13e for receiving the system clock is connected to the clock generator 13f for generating the bit clock and to the buffer 13g in series. The bit clock transferred from the clock generator 13f is transferred to both the clock terminal of the cell input circuit 13d and the clock terminal in the flip flop circuit 13d-1 in the changeable delay circuit 13b.

The output terminal of the data output buffer 12c in the receiver LSI 12 is connected to the input terminal of the data input buffer 13a. Thereby, the data path or data line for transferring cell data from the transfer LSI 11 to the receiver LSIs 12 and 13 in serial connection is formed.

Next, the operation of the ATM cell processing device 200 of the embodiment 2 described above will be explained.

Each of the transfer LSI 11, the receiver LSIs 12 and 13 receives the system clock from the board (not shown). Then, each of the clock generators 11b, 12f and 13f in the LSIs 11, 12 and 13 generates the bit clock based on the system clock. For example, when the frequency of the system clock is 25 MHz and the frequency of the bit clock is 100 MHz, the PLL circuit in each of the clock generators 11b, 12f and 13f generates the bit clock of 100 MHz. Further, the bit clock of 100 MHz generated by the PLL circuit in the clock generator is divided into a clock of 25 MHz. This clock of 25 MHz is compared with the system clock. The frequency timing of each bit clock is adjusted based on the comparison result. The bit clocks in the LSIs 11, 12 and 13 are in synchronism with each other. Thereby, cell data can be transferred between LSIs 11, 12 and 13 synchronously.

Like the ATM cell processing device 100 of the embodiment 1, there are two cases to transfer cell data between the transfer LSIs 11 and the receiver LSIs 12 and 13. In the first case, the transfer LSI 11 transfers a cell data to only one of the receiver LSIs 12 and 13. In the second case, the transfer LSI 11 transfers a cell data to both the receiver LSIs 12 and 13. In both cases, the transfer LSI 11 adds an identifier into the header in the cell data to be transferred. Of course, when the cell data is transferred to both the receiver LSIs 12 and 13, the identifiers designating both the receiver LSIs 12 and 13 are added into the header of the cell data to be transferred.

Each of the receiver LSIs 2 and 3 have selection circuits (detection means) 12d-1 and 13d-1, respectively for checking whether or not the cell data is transferred from the transfer LSI 11. In other words, each of the selection circuits (detection means) 12d-1 and 13d-1 checks whether or not there is its own identifier in the header section of the cell data. When there is such an identifier in the header section of the cell data which has been transferred, the receiver LSI receives the cell data into the cell input circuit 12d or 13d inside of the receiver LSI 12 or 13. When the transfer LSI 11 transfers a same cell data item to both the receiver LSIs 12 and 13, first, the transfer LSI 11 transfers the cell data item directly to the receiver LSI 12. Second, the cell data item is transferred from the receiver LSI 12 to the receiver LSI 13 through the input buffer 12a, the flip flop circuit 12b-1 and the output buffer 12c. Thereby, the transfer LSI 11 can transfer the cell data item to both the receiver LSIs 12 and 13 in point to point connection.

In a skew reducing method for reducing a skew in the ATM cell processing device 200 of the embodiment 2, the cell input circuit 13d in the receiver LSI 13 receives the cell data under the condition that the delay time of the changeable delay circuit 13b is set to zero by selecting the buffer 13a side by the selector 13b-2. On the other hand, the cell input circuit 12d in the receiver LSI 12 receives the cell data under the condition that the delay time of the changeable delay circuit 12b is set to one cycle in the bit cycle by selecting the flip flop circuit 12b-1 side by the selector 12b-2. Thereby, cell input circuits 12d and 13d in the receiver LSIs 12 and 13 can receive the cell data in a same cycle. Although, the number of the receiver LSIs is two in the ATM cell processing device 200 of the embodiment 2 described above, the present invention is not limited to this configuration. It is acceptable that the ATM cell processing device comprises receiver LSIs whose number is not less than two. The data receiver LSIs form the cross point ATM switch. In this case, the delay value of each changeable delay circuit in each receiver LSI is determined based on the stage number counted from the transfer LSI 11.

In addition, when the ATM cell processing device 200 of the embodiment 2 is mounted on a board, the number of each LSI is increased. Specifically, the numbers of input pin used for receiving data between the transfer LSI 11 and the receiver LSI is increased. For example, when an ATM cell processing device having the 8 input/output ports and the data transfer speed of 155 Mbps is fabricated, and when this ATM cell processing device including a plurality of receiver LSIs having an ATM switch configuration is performed under the condition that both an ECL (Emitter coupled Logic) interface of approximately 155 MHz and a system clock operate at the same time, a cell data can be transferred under one serial bit per one input/output port. The required number of input signal pins becomes two (cell data/clock), and the whole input pin number of 8 input ports becomes 16 (2×8=16). Thereby the increased number of signal pins becomes only 16 when the ATM cell processing device of the embodiment 2 is incorporated.

Similarly, when LVDS (Low Voltage Differential Signals) of 155 MHz is used, the increased number of signal pins becomes 32 which is twice of the case of the cross-point type ATM switch LSI described above.

Specifically, by applying the present invention to a technical field in which a high speed interface is used, the cost of performance (COP) of devices of the present invention can be improved ones that of devices using the conventional distribution LSI.

As described above in detail, in the ATM cell processing device as the digital information processing device of the present invention, each receiver LSI has a data input buffer and data output buffer connected to the data input buffer. The input side of the data input buffer in one receiver LSI is connected to the data output buffer of a receiver LSI as a preceding and the output buffer in the receiver LSI is connected to the input buffer of a receiver LSI as a following stage. Thereby, the cell data path can be formed and the same cell data transferred from the transfer LSI is transferred to the receiver LSIs in order through the cell data path. Accordingly, it is not required to incorporate any distribution LSI which is required for a conventional ATM transfer device in order to have the cell data path of the point to point connection in the ATM cell processing device of the present invention. Thereby, the number of wires on a LSI board on which the transfer and receiver LSIs are mounted can be reduced. In addition, the COP and the expendability of the digital information processing device can be increased.

In addition, because each receiver LSI described above has a function of selectively receiving cell data transferred from the transfer LSI, the cell data can be transferred only to a target receiver LSI.

Furthermore, because each receiver LSI described above has a function to adjust a data transfer and receive timing of the cell data transferred from the transfer LSI, the delay of the data receiving timing in each receiving LSI can be reduced.

Moreover, because the data transfer path between the receiver LSIs and the transfer LSI includes a flip flop circuit, the data input/output operation in each receiver LSI is performed in synchronism with the system clock.

In addition, because the ATM cell processing device as the digital information processing device of the present invention is capable of processing a packet data, designers can easily design a board on which various type devices including the ATM cell processing device are mounted and the designer can provide the ATM cell processing device having a bus connection structure of a higher Cost of Performance.

Although the present invention has been described and illustrated in detail, it is clearly understood that the same is by way of illustration and example only and is not to be taken by way of limitation, the spirit and scope of the present invention being limited only by the term of the appended claims.

What is claimed is:

1. A digital information processing device, comprising:
   a data transfer Large Scale Integration (LSI) capable of transferring data; and
   a plurality of data receiver LSIs connected in a cascade connection to each other and capable of receiving said data having a same content transferred from said data transfer LSI, each of said plurality of data receiver LSIs comprising:
   a data input buffer for receiving said data; and
   a data output buffer connected to an output side of said data input buffer,
   wherein an output side of said data output buffer in one of said plurality of data receiver LSIs is connected to an input side of said data input buffer in another one of said plurality data receiver LSIs in a following stage in order to form a data transfer path having a cascade connection, and
   wherein said data transfer LSI transfers said data to said data input buffer in said data receiver LSI in a first stage in said plurality of data receiver LSIs, each of said plurality of data receiver LSIs further comprising a changeable delay means incorporated between said data input buffer and said data output buffer in each data receiver LSI through which said data is delayed by a time corresponding to its own stage number counted from said data transfer LSI in said data transfer path having said cascade connection, and thereby each of said plurality of receiver LSIs stores said data transferred from said data transfer LSI by delaying a storing operation by the corresponding delay time.

2. A digital information processing device as claimed in claim 1, wherein each of said plurality of data receiver LSIs further comprises detection means for checking whether or not said data transferred from said data transfer LSI is transferred to its own, after a checking operation by said detection means in each data receiver LSI, said data receiver LSI stores therein said data only when said data is transferred to its own from said data transfer LSI.

3. A digital information processing device as claimed in claim 2, wherein said data transfer LSI is capable of transferring packet data based on an ATM cell format as said data to be transferred, and each of said plurality of data receiver LSIs is capable of receiving and processing said packet data.

4. A digital information processing device as claimed in claim 1, wherein said changeable delay circuit comprises a flip-flop circuit, said data transfer path is made up of said plurality of data receiver LSIs connected in the cascade connection, and said flip-flop circuit forming said changeable delay means is incorporated between said data input buffer and said data output buffer.

5. A digital information processing device as claimed in claim 4, wherein said data transfer LSI is capable of transferring packet data based on an ATM cell format as said data to be transferred, and each of said plurality of data receiver LSIs is capable of receiving and processing said packet data.

6. A digital information processing device as claimed in claim 1, wherein said data transfer LSI is capable of transferring packet data based on an ATM cell format as said data to be transferred, and each of said plurality of data receiver LSIs is capable of receiving and processing said packet data.

7. A digital information processing device, comprising:

a data transfer Large Scale Integration (LSI) capable of transferring data; and a plurality of data receiver LSIs connected in a cascade connection to each other and capable of receiving said data having a same content transferred from said data transfer LSI, each of said plurality of data receiver LSIs comprising:

a data input buffer for receiving said data; and a data output buffer connected to an output side of said data input buffer, wherein an output side of said data output buffer in one of said plurality of data receiver LSIs is connected to an input side of said data input buffer in another one of said plurality data receiver LSIs in a following stage in order to form a data transfer path having a cascade connection, and wherein in said data transfer path having said cascade connection, said data transfer LSI transfers said data to said data receiver LSI in a first stage in said plurality of data receiver LSIs, and said data receiver LSI in the first stage receives only said data having the same content and stores said data into said data input buffer in said data receiver LSI in the preceding stage.

8. A digital information processing device as claimed in claim 7, wherein said data transfer LSI is capable of transferring packet data based on an ATM cell format as said data to be transferred, and each of said plurality of data receiver LSIs is capable of receiving and processing said packet data.

9. A digital information processing device as claimed in claim 7, wherein said data transfer LSI further comprising a bit clock buffer for transferring a bit clock and each of said plurality of data receiver LSIs comprising a bit clock buffer for receiving said bit clock transferred from said data transfer LSI through said data receiver LSIs in preceding stages, and said data transfer LSI and said plurality of data receiver LSIs operate synchronously to each other.

10. A digital information processing device as claimed in claim 7, wherein said data transfer LSI further comprising a system clock buffer for receiving a system clock and each of said plurality of data receiver LSIs comprising a system clock buffer for receiving said system clock, and said data transfer LSI and said plurality of data receiver LSIs operate in synchronism with said system clock to each other.

11. A digital information processing device, comprising:

a data transfer Large Scale Integration (LSI) capable of transferring data; and a plurality of data receiver LSIs connected in a cascade connection to each other and capable of receiving said data having a same content transferred from said data transfer LSI, each of said plurality of data receiver LSIs comprising:

a data input buffer for receiving said data; and a data output buffer connected to an output side of said data input buffer, wherein an output side of said data output buffer in one of said plurality of data receiver LSIs is connected to an input side of said data input buffer in another one of said plurality data receiver LSIs in a following stage in order to form a data transfer path having a cascade connection, and wherein said data transfer LSI transfers data, including an identifier or identifiers designating at least one of said data receiver LSIs of said plurality of data receiver LSIs to said data input buffer in said data receiver LSI in a first stage in said data transfer path having said cascade connection, and each of said plurality of data receiver LSIs further comprises detection means for checking whether or not said data has been transferred from said data transfer LSI, after a checking operation in each data receiver LSI, said data receiver LSI receives and stores said data therein only when said data has been transferred from said data transfer LSI.

12. A digital information processing device as claimed in claim 11, wherein said data transfer LSI is capable of transferring packet data based on an ATM cell format as said data to be transferred, and each of said plurality of data receiver LSIs is capable of receiving and processing said packet data.

13. A digital information processing device, comprising:

a data transfer Large Scale Integration (LSI) capable of transferring data; and a plurality of data receiver LSIs connected in a cascade connection to each other and capable of receiving said data having a same content transferred from said data transfer LSI, each of said plurality of data receiver LSIs comprising:

a data input buffer for receiving said data; and a data output buffer connected to an output side of said data input buffer, wherein an output side of said data output buffer in one of said plurality of data receiver LSIs is connected to an input side of said data input buffer in another one of said plurality data receiver LSIs in a following stage in order to form a data transfer path having a cascade connection, and wherein said data transfer LSI is capable of transferring packet data based on an ATM cell format as said data to be transferred, and each of said plurality of data receiver LSIs is capable of receiving and processing said packet data.

14. An ATM cell processing device, comprising:

a first Large Scale Integration (LSI) for transferring data in the form of cells;

a second LSI for receiving data transferred from said first LSI and comprising second buffer means and a second cell input circuit; and a third LSI for receiving data transferred from said first LSI through said second LSI and comprising third buffer means connected to said second buffer means in a cascade connection and a third cell input circuit, wherein said second LSI receives all the data transferred from said first LSI by said second buffer means and stores said data in said second cell input circuit, wherein said third LSI receives all the data transferred from said first LSI through said second buffer means and said third buffer means and stores said data in said third cell input circuit.

* * * * *